UNITED STATES PATENT OFFICE.

ROBERT DE LUCE, OF FRESNO, CALIFORNIA.

PROCESS OF PRODUCING LIME-POTASH FERTILIZER FROM POTASH-BEARING MINERALS AND LIME.

1,345,077.

Specification of Letters Patent.   Patented June 29, 1920.

No Drawing.   Application filed April 9, 1920.   Serial No. 372,711.

*To all whom it may concern:*

Be it known that I, ROBERT DE LUCE, a citizen of the United States, residing at Fresno, in the county of Fresno, State of California, have invented certain new and useful Improvements in Processes of Producing Lime-Potash Fertilizer from Potash-Bearing Minerals and Lime; and I do declare the following to be a full, clear, and exact description of the same.

This invention relates to an improved process for producing a lime-potash mixture, suitable for soil fertilizing purposes, from potash bearing rock or other mineral, and calcined lime.

The principle of my invention is to devise a process for the purpose stated which will be dynamic rather than static; that is, the chemical reactions between the ingredients necessary to obtain the required resultant mixture will occur under conditions of rapid movement and violent circulation of the elements within the mixture whereby intimate contact secures rapid completion of the process.

By this means I am enabled to use a much smaller plant, or outfit, for the production of the fertilizer than would have to be used for making the same quantity with static methods.

I also claim to be able to make a soluble potash from the mineral used at a minimum of time, expense and labor, and am enabled to utilize a common form of mineral, such as low grade feldspar, with great success to produce a fertilizer therefrom cheaper than is now obtained with scarcer and higher grade mineral.

The process is carried out as follows: The potash bearing rock, or mineral, is pulverized and mixed with a quantity of pulverized calcined lime in excess of its own weight. This mixture is then heated to a temperature between 200° and 250° C. and introduced into a suitable vessel.

While still in its heated state the mixture is blown through a nozzle by means of superheated steam and in this nozzle there is injected into this mixture jets of hot water and the dynamic force of steam carries the whole mixture into a pressure tank.

The pressure thereby produced may be as high as the tank will withstand. A temperature of 200° C. or 200 pounds steam pressure I have found to be very suitable.

By reason of this treatment of the mixture the chemical reactions are speedily and thoroughly completed.

After blowing a charge into the pressure tank, or dynamic pressure processer, as I term it, the material is discharged into an open and shallow vat, or tank, so as to permit of rapid evaporation of the moisture from the mixture, during which time the latter absorbs carbon dioxid from the air.

The resultant and final product obtained is a mixture of lime and potassium carbonates and calcium aluminum silicate.

This product is a well known and valuable fertilizer for agricultural purposes, both on account of the lime and the potash contents.

The grade of fertilizer obtained is of course dependent on the proportionate amounts of lime and potash material used.

What I claim as new and useful and desire to secure by Letters Patent is:

1. A dynamic process of producing lime-potash fertilizer including the mixing of potassium bearing mineral with excess of its own weight of pulverized calcium oxid, and then passing the mixture into a pressure tank by means of superheated steam.

2. A dynamic process of producing lime-potash fertilizer including the mixing of potassium bearing mineral with excess of its own weight of pulverized calcium oxid, heating the mixture above 100° C. blowing the mixture into a pressure tank by means of superheated steam, and then discharging the contents of the tank into an open shallow vat.

3. A dynamic process of producing lime-potash fertilizer including the mixing of potassium bearing mineral with an excess of its own weight of pulverized calcium oxid, heating the mixture above 100° C. introducing the mixture into a nozzle connected with a pressure tank, in this nozzle there is injected into the mixture jets of hot water, the nozzle having a flow of superheated steam under pressure passing therethrough and into the pressure tank and then discharging the contents of the tank into an open shallow vat.

4. A dynamic process of producing lime-potash fertilizer consisting of mixing a quantity of pulverized potassium bearing mineral with a quantity of pulverized calcium oxid in excess of its own weight, heating the mixture to a temperature between 200° and 250° C. forcing the mixture while heated into a pressure tank through jets of hot water by means of superheated steam under pressure, and then exposing the mixture to the free action of the atmosphere.

5. A dynamic method of producing a mixture of lime and potassium carbonates and calcium aluminum silicate consisting of mixing a quantity of pulverized potassium bearing mineral with a quantity of pulverized calcium oxid in excess of its own weight, heating the mixture to a temperature between 200° and 250° C. forcing the mixture while heated into a pressure tank through jets of hot water by means of a stream of superheated steam under pressure, and then exposing the mixture to the free action of the atmosphere.

6. A dynamic process of producing lime-potash fertilizer including the mixing of potassium bearing mineral with excess of its own weight of pulverized calcium oxid, heating the mixture above 100° C., then passing the mixture through jets of hot water into a pressure tank by means of the pressure of superheated steam, and then subjecting the mixture to the free action of the atmosphere.

ROBERT DE LUCE.